(12) United States Patent
Gurunathan et al.

(10) Patent No.: US 9,639,130 B2
(45) Date of Patent: May 2, 2017

(54) PARALLEL CONTROL OF MULTIPLE UNINTERRUPTABLE POWER MODULES ("UPMS")

(71) Applicant: Bloom Energy Corporation, Sunnyvale, CA (US)

(72) Inventors: Ranganathan Gurunathan, Bangalore (IN); Arne Ballantine, Palo Alto, CA (US); Prasad Pmsvvsv, Sunnyvale, CA (US); Carl Cottuli, Franklin, MA (US); Saravanakumar Narayanasamy, Bangalore (IN); Badri Narayanan, Bangalore (IN); Deepak Balakrishnan, Bangalore (IN)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 468 days.

(21) Appl. No.: 14/246,716

(22) Filed: Apr. 7, 2014

(65) Prior Publication Data
US 2015/0288220 A1    Oct. 8, 2015

(51) Int. Cl.
| | |
|---|---|
| *G06F 1/26* | (2006.01) |
| *H02J 9/06* | (2006.01) |
| *H02J 3/38* | (2006.01) |
| *H02J 1/10* | (2006.01) |

(52) U.S. Cl.
CPC ............... *G06F 1/26* (2013.01); *H02J 1/102* (2013.01); *H02J 3/383* (2013.01); *H02J 9/062* (2013.01); *Y10T 307/62* (2015.04)

(58) Field of Classification Search
CPC ........ H02J 2003/388; H02J 3/28; H02J 3/005; H02J 9/00; H02J 9/061; H02J 9/06; H02J 3/386; H02J 3/387; H02J 3/383; Y10T 307/62; G06F 1/263; G06F 1/26
See application file for complete search history.

(56) References Cited

U.S. PATENT DOCUMENTS

| | | | | |
|---|---|---|---|---|
| 8,035,250 B2* | 10/2011 | Caudill | ..................... | H02J 3/46 307/65 |
| 8,442,698 B2* | 5/2013 | Fahimi | ..................... | H02J 3/32 700/287 |
| 2012/0098336 A1* | 4/2012 | Gurunathan | ............ | H02M 1/10 307/18 |
| 2014/0159493 A1* | 6/2014 | Chen | ..................... | H02J 9/062 307/65 |

* cited by examiner

*Primary Examiner* — Ryan Johnson
(74) *Attorney, Agent, or Firm* — The Marbury Law Group PLLC (57) ABSTRACT

Systems, methods, and devices of the various embodiments enable parallel control of multiple uninterruptable power modules ("UPMs") connecting multiple power sources to a bus in parallel. A UPM may be comprised of at least one controller coupled to at least one inverter, and the UPM may be configured to convert the DC voltage output from a DC source to an AC voltage, such as an AC voltage suitable for output to an AC bus. A UPM may receive a power sharing command and control its at least one inverter based at least in part on the received power sharing command to output a voltage to a bus.

24 Claims, 7 Drawing Sheets

PARALLEL CONTROL OF MULTIPLE UNINTERRUPTABLE POWER MODULES ("UPMS")

BACKGROUND

Information technology (IT) loads are often deployed in racks or cabinets that in most markets currently average 4-6 KW per rack. Technology is getting denser with racks going over 40 KW per rack and even higher for high performance computing applications. Applications in the range of 8-35 KW are becoming more and more popular with blades, heavy storage, and networking being integrated for mobility reasons.

Cloud computing is allowing utilization of more distributed configurations with better utilization of existing data centers, public clouds, and new private clouds created in a way that is allowing optimal operation for enterprises or the small and medium business (SMB) market, for example, by allowing "Everything as a Service" way of utilization for the cloud consumer. "Infrastructure as a Service" models are better synchronized to the requirements of businesses, therefore, there is a need in the market for building blocks for such infrastructure that will allow overall faster time to market at optimal cost.

Electrical power systems can be used to provide electrical power to one or more loads, such as IT loads. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of power sources may be combined in a single electrical power system.

SUMMARY

The systems, methods, and devices of the various embodiments enable parallel control of multiple uninterruptable power modules ("UPMs") connecting multiple power sources to a bus in parallel. In an embodiment, a UPM may be comprised of at least one controller coupled to at least one inverter, and the UPM may be configured to convert the direct current (DC) voltage output from a DC source to an alternating current (AC) voltage, such as AC voltage suitable for output to an AC bus. In an embodiment, a UPM may include two redundant controllers both switchably coupled to at least one inverter. In an embodiment, a UPM may receive a power sharing command and control its at least one inverter based at least in part on the received power sharing command to output a voltage to a bus. In an embodiment in which UPMs are connected in parallel, a power sharing command may direct one or more of the UPMs to provide power equally to the bus or a power sharing command may direct one or more of the UPMs to provide power unequally to the bus.

DETAILED DESCRIPTION

The systems, methods, and devices of the various embodiments enable parallel control of multiple uninterruptable power modules ("UPMs") connecting multiple power sources to a bus in parallel. In an embodiment, a UPM may be comprised of at least one controller coupled to at least one inverter, and the UPM may be configured to convert the direct current (DC) voltage output from a DC source to an alternating current (AC) voltage, such as AC voltage suitable for output to an AC bus. In an embodiment, a DC source may be a power source that generates a DC output, such as one or more fuel cell, solar array, wind turbine, thermo-electric device, battery, etc. or an AC source, such as the AC grid, connected to an AC to DC converter to generate a DC output. In an embodiment, a UPM may include two redundant controllers both switchably coupled to at least one inverter. In an embodiment, a UPM may receive a power sharing command and control its at least one inverter based at least in part on the received power sharing command to output a voltage to a bus. In an embodiment in which UPMs are connected in parallel, a power sharing command may direct one or more of the UPMs to provide power equally to the bus or a power sharing command may direct one or more of the UPMs to provide power unequally to the bus.

Figure 1:
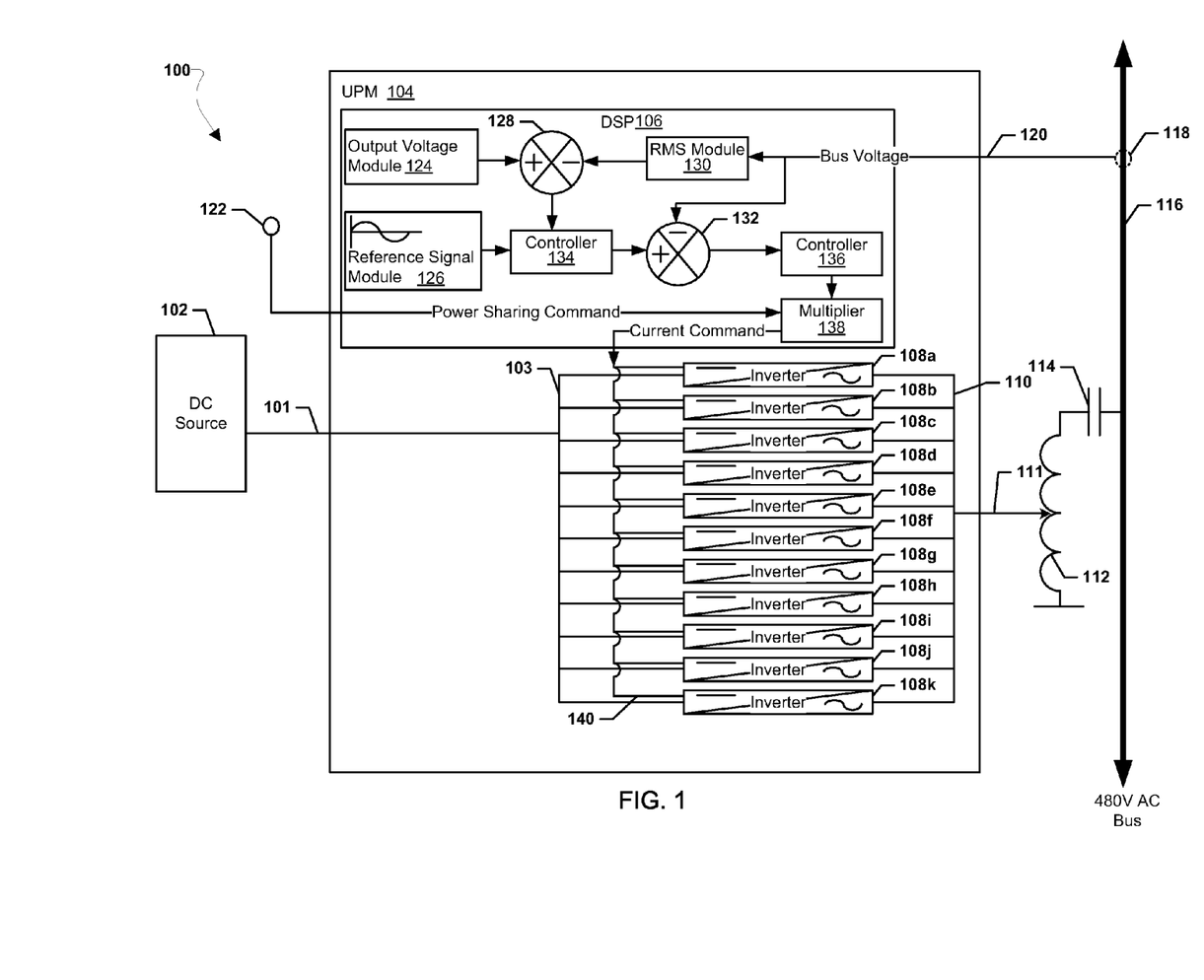
FIG. 1 is a block diagram illustrating a portion of a parallel UPM system according to an embodiment.

FIG. 1 is a block diagram illustrating a portion of a parallel UPM system 100 according to an embodiment. A DC source 102 may be connected by a DC input line 101 to a UPM 104. The DC source 102 may be any type of power source that in operation may provide DC power to the DC input line 101 and UPM 104. As examples, the DC source 102 may be one or more fuel cell of a fuel cell system (such as the fuel cell system described in U.S. Pat. No. 8,563,180 which is incorporated herein by reference in its entirety), one or more solar array, one or more wind turbine, one or more thermo-electric device, one or more battery, etc. As another example, the DC source 102 may be an AC source, such as the AC grid, connected to an AC to DC converter which may be connected to the DC input line 101, thereby enabling the AC power from the AC grid to be converted to DC power provided to the DC input line 101 and the UPM 104.

The UPM may include a DC bus 103 that may connect the DC input line 101 to a series of one or more inverters of the UPM 104, such as eleven inverters 108a, 108b, 108c, 109d, 108e, 108f, 108g, 108h, 108h, 108i, 108j, and 108k included in the UPM 104. In this manner, through the DC input line 101 and the DC bus 103 the inverters 108a-k may each be connected to the DC source 102. In operation the inverters 108a-108k may receive the DC power output from DC source 102, convert the DC power to AC power, and output the AC power to an AC bus 110 of the UPM 104. The inverters 108a-k may each be connected to a current command bus 140 to receive a current command from the processor, such as digital signal processor (DSP) 106, of the UPM 104. In operation, the current command received from the DSP 106 via the current command bus 140 may control the inverters 108a-k to draw a selected current, voltage, and/or power from the DC source 102 and/or output a selected current, voltage, and/or power to the AC bus 110. In an embodiment, the inverters 108a-k may each be hysteresis inverters each controlled through a hysteretic DC bus voltage controller that may control the reverse power flow into the inverter in case of faults when operating in an islanding condition with the grid voltage. In this manner, if the DC bus voltage exceeds a certain value, the inverters 108a-k may be turned off and then automatically turned on when the dc bus voltage falls below a certain voltage.

The AC bus 110 may be connected to an AC output line 111 of the UPM 104, and in this manner the inverters 108a-k may output AC power to the AC output line 111. The AC output line 111 of the UPM 104 may be connected to an AC bus 116, such as a 480V AC bus, and in operation the AC power output from the inverters 108a-k and AC bus 110 of the UPM 104 may be provided the AC bus 116 via the AC output line 111. The AC bus 116 may be any type AC bus, such as a three phase AC bus described in U.S. Pat. No. 7,705,490 which is incorporated herein by reference in its entirety, a two phase AC bus, a single phase AC bus, etc. The AC output line 111 of the UPM 104 may be connected to the AC bus 116 by one or more smoothing or conditioning circuits, such as one or more inductor 112 and/or capacitor 114 connected between the AC output line 111 and AC bus 116.

In an embodiment, the DSP 106 of the UPM 104 may be connected to a voltage sensor 118 by a voltage sensor connection 120 of the UPM 104. In operation the voltage sensor 118 may measure the voltage of the AC bus 116 and output bus voltage measurements that may be received in the DSP 106 of the UPM 104 via voltage sensor connection 120. In this manner, the DSP 106 may sense the output voltage on the AC bus 116.

In an embodiment, the DSP 106 of the UPM 104 may include a connection 122, such as a wired or wireless connection, to an input controller. The input controller may send power sharing commands to the DSP 106 of the UPM 104 via the connection 122 and the DSP 106 of the UPM 104 may receive the power sharing commands and control the operation of the UPM 104 based at least in part on the received power sharing commands. In an embodiment, the power sharing command may be a command received from an input controller that indicates an allocation of the load demand for the AC bus 116 that the UPM 104 may be required to meet based on the capacity of the DC source 102 connected to the UPM 104. In response to the power sharing command received on connection 122, the DSP 106 may control the operations of the inverters 108a-k via a current command on the current command bus 140 to output a selected AC current, voltage, and/or power to the AC bus 116.

In an embodiment, the DSP 106 may generate a required current command based on the voltage of the AC bus 116 as measured by the voltage sensor 118. Based on analysis of modules of a voltage loop running on the DSP 106 that may compare the voltage of the AC bus 116 with a selected reference voltage, such as 480 volts RMS, the DSP 106 may determine a power draw from the DC source 102 needed to meet a load demand of the AC bus 116. The DSP 106 may generate the required current command to control the inverters 108a-k to meet the load demand of the AC bus 116. The voltage loop running on the DSP 106 may include various modules, such as an output voltage module 124, controllers 134 and 136, an RMS module 130, reference signal module 126, and comparator modules 128 and 132. In operation, the RMS value of the measured bus voltage of the AC bus 116 may be determined by the RMS module 130 and compared to a selected reference voltage indicated by the output voltage module 124, such as 480 V RMS, by the comparator module 128. The output of the comparator module 128 and a reference signal, such as a free running sign wave at a fixed frequency or an output of a controller synchronized to another source (e.g., the grid, a generator, etc.), output by the reference signal module 126 may be used by the controller 134, such as a d-q controller, to output a reference signal sent to comparator module 132. The comparator module 132 may compare the bus voltage of the AC bus 116 to the reference signal and output the result of the comparison to controller 136 which may determine a power draw from the DC source 102 needed to meet a load demand based on the difference between the reference signal and the voltage of the AC bus 116. The controller 136, such as a d-q controller, may generate a required current command corresponding to the determined power draw from the DC source 102 need to meet the load demand. The controller 136 may output the required current command to the multiplier module 138.

The multiplier module 138 of the DSP 106 may multiply any received power sharing command received on connection 122 with the required current command generated by the voltage loop of the DSP 106 (i.e., the required current command received from the controller 136) to generate the output current command output to the inverters 108a-k via the current command bus 140. For example, the power sharing command may be a value from 0.00 to 1.00 indicating the percentage of the load demand the DC source 102 should support. The output current command via the current command bus 140 may control the inverters 108a-k to convert the DC output of the DC power source 102 to an AC output provided to the AC bus 116 to meet the share of the load demand assigned to the UPM 104 as indicated by the power sharing command received via connection 122.

Figure 2:
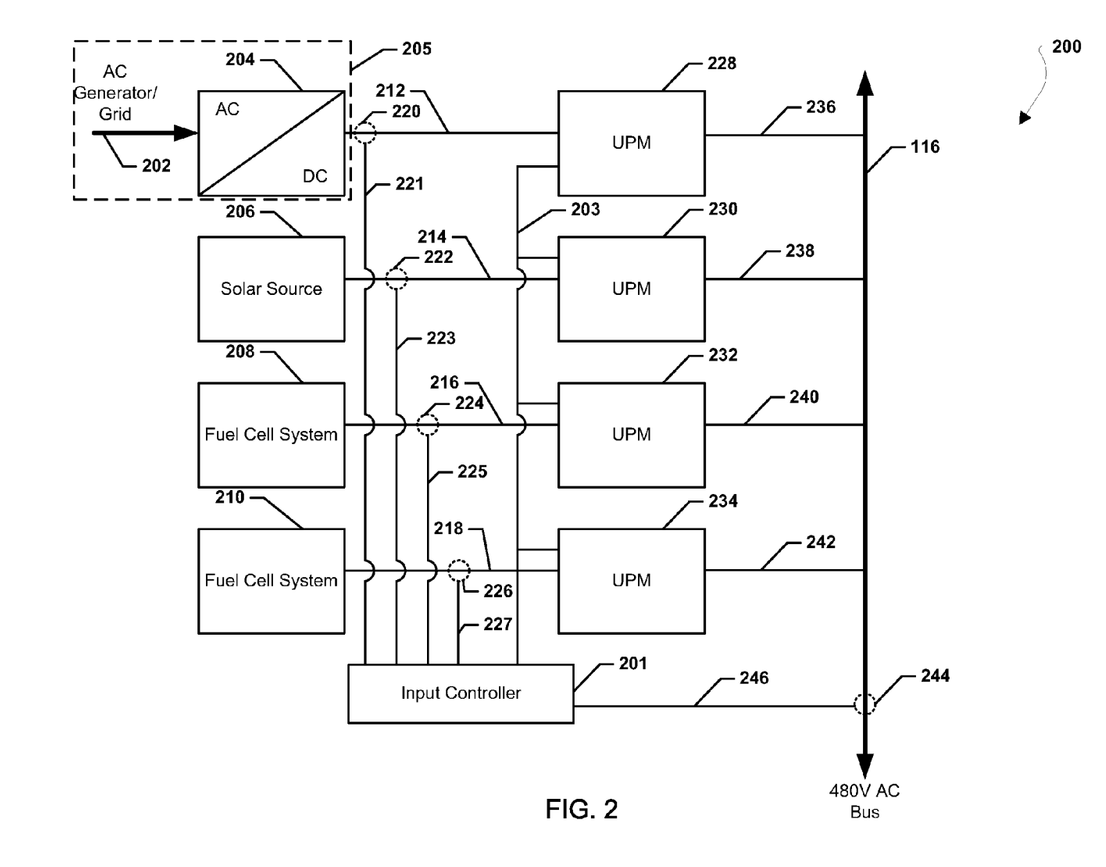
FIG. 2 is a block diagram of a parallel UPM system according to an embodiment.

FIG. 2 illustrates a parallel UPM system 200 according to an embodiment. The parallel UPM system 200 may include multiple DC power sources, such as DC power sources 205, 206, 208, and 210. DC power source 205 may include an input from an AC source 202, such as an AC generator or AC grid, provided to an AC to DC converter 204. In operation the AC to DC converter 204 may convert an AC input received from the AC source 202 to a DC power output to DC input line 212. DC power source 206 may be a solar source, such as a solar array, and may generate a DC power output to DC input line 214. DC power source 208 may be a fuel cell system, such as one or more power modules including fuel cell stacks as described in U.S. Pat. No. 8,440,362 which is incorporated herein by reference in its entirety, and may generate DC power output to DC input line 216. DC power source 210 may be a fuel cell system and may generate DC power output to DC input line 218. DC power sources 208 and 210 may be entirely separate fuel cell systems or may be different fuel cell stacks of the same fuel cell system. Other DC power sources may be substituted for the various DC power sources 205, 206, 208, and 210, such as wind turbines, thermo-electric devices, batteries, or any other type of DC power source.

Each DC power source 205, 206, 208, and 210 may be connected to a UPM 228, 230, 232, and 234, respectively, which may be connected to the AC bus 116 by its own respective AC output line 236, 238, 240, and 242. In this manner, the UPMs 228, 230, 232, and 234 may connect its respective DC power source 205, 206, 208, and 210 to the AC bus 116. The UPMs 228, 230, 232, and 234 may be any type UPM, such as the UPM 104 described above with reference to FIG. 1 or the UPM 402 described below with reference to FIG. 4.

The parallel UPM system 200 may include an input controller 201 which may be connected to each UPM 228, 230, 232, and 234 by a communication bus 203, such as controller area network (CAN) bus or other type wired or wireless communication connection(s), enabling the input controller 201 and UPMs 228, 230, 232, and 234 to exchange data. The input controller 201 may be connected to a voltage sensor 220 on the DC input line 212 by a voltage sensor connection 221, a voltage sensor 222 on the DC input line 214 by a voltage sensor connection 223, a voltage sensor 224 on the voltage input line 216 by a voltage sensor connection 225, and a voltage sensor 226 on the DC input line 218 by a voltage sensor connection 227. In operation the voltage sensors 220, 222, 224, and 226 may each measure the voltage of their respective DC input line 212, 214, 216, and 218 and output DC input line voltage measurements that may be received by the input controller 201 via the respective voltage sensor connections 221, 223, 225, and 227. In this manner, the input controller 201 may sense the output voltage of each of the DC power sources 205, 206, 208, and 210.

The input controller 201 may be connected to a voltage sensor 224 by a voltage sensor connection 246. In operation the voltage sensor 224 may measure the voltage of the AC bus 116 and output bus voltage measurements that may be received in the input controller 201 via voltage sensor connection 246. In this manner, the input controller 201 may sense the output voltage on the AC bus 116.

In operation the input controller 201 may monitor the output voltage of the AC bus 116 and the output voltage of one or more of the DC power sources 205, 206, 208, and 210 based at least in part on the output voltage of the AC bus 116 and/or the output voltage of one or more of the DC power sources 205, 206, 208, and 210 may generate power sharing commands for the respective UPMs 228, 230, 232, and 234 to indicate to each UPM 228, 230, 232, and 234 the share of the load demand each UPM 228, 230, 232, and 234 should support. For example, the input controller 201 may generate power sharing commands to control the sharing of the power between the UPMs 228, 230, 232, and 234 based at least in part on the power available from each respective DC power source 205, 206, 208, and 210. In an embodiment, the input controller 201 may generate power sharing commands such that each UPM 228, 230, 232, and 234 shares the load demand equally. In another embodiment, the input controller 201 may generate power sharing commands such that one or more of the UPMs 228, 230, 232, and 234 may provide different shares of the load demand. For example, the input controller 201 may sense that the input voltage from the DC power source 210 has fallen below a certain voltage level based on the measurements received from the voltage sensor 226 and in response may adjust the power sharing command for the UPM 234 and the UPMs 228, 230, and 232 to maintain the input voltage level to the AC bus 116 to meet the load demand on the AC bus 116. The ability to send different power sharing commands to different UPMs 228, 230, 232, and 234 may enable the input controller 201 to account for life cycle or other cause degradation in the DC power sources 205, 206, 208, and 210 and/or to account for different power capacities among the different DC power sources 205, 206, 208, and 210, such as different capacities between solar power, fuel cell, wind power, etc. (e.g., output voltage from solar panels at night). Additionally, the ability to send different power sharing commands to different UPMs 228, 230, 232, and 234 may enable the input controller 201 to act as a walk-in controller when a new UPM and/or DC power source is connected to the AC bus 116 and/or started up.

The input controller 201 may send each generated power sharing command to its respective UPM 228, 230, 232, or 234 via the communication bus 203. Communication bus 203 may include various connections enabling the input controller 201 to exchange data with UPMs 228, 230, 232, and/or 234, such as connections 122 described above and/or connections 422 and 428 described below. Each UPM 228, 230, 232, and 234 may receive its respective power sharing command from the input controller 201 via the communication bus 203 and control its respective series of one or more inverters to convert the DC output from its respective DC power source 205, 206, 208, or 210 to an AC output provided to the AC bus 116 via its respective AC output line 236, 238, 240, or 242 based at least in part on its received power sharing command.

Figure 3:
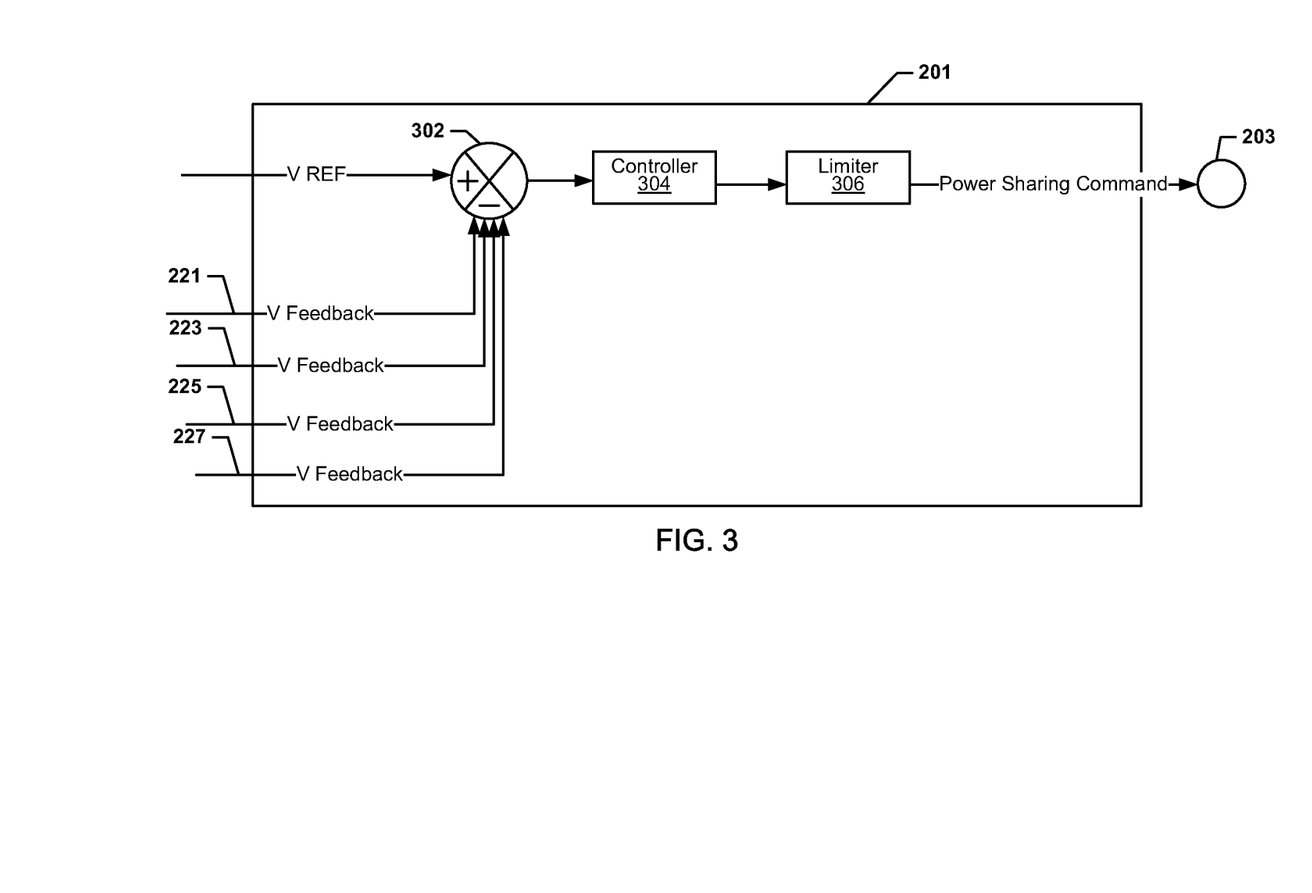
FIG. 3 is a block diagram of an input controller of a UPM system according to an embodiment.

FIG. 3 is a block diagram of example modules of the input controller 201 of a UPM system according to an embodiment. For example, the input controller 201 may be a processor, such as a DSP. The input controller 201 may receive a reference voltage "V REF", which may be an output of a controller generating a reference DC voltage value for a given DC power source 205, 206, 208, or 210 of the system 200 or a stored value of a reference DC voltage value for a given DC power source 205, 206, 208, or 210 of the system 200. The input controller 201 may receive a voltage feedback "V Feedback" from a voltage sensor 220, 222, 224, or 226 (via connections 221, 223, 225, and 227) associated with a given DC power source 205, 206, 208, or 210 of the system 200 and a comparator module 302 may compare the "V REF" to the "V Feedback" for a given DC power source 205, 206, 208, or 210 of the system 200. Based on the difference between the "V REF" and the "V Feedback" a controller module 304 may determine the power to be drawn from the given DC power source 205, 206, 208, or 210 to meet the load demand for the system 200 and that power setting may be multiplied by a limiter value by a limiter module 306. The limiter module 306 may use the indication of the power to be drawn from the given DC power source 205, 206, 208, or 210 received from the controller module 304 to select a limiter value representing the share of the power to be drawn from the given DC power source 205, 206, 208, or 210, such as a value between 0.0 and 1.0 representing the percentage of the load demand to be met by the given DC power source 205, 206, 208, or 210. The limiter module 306 may output the selected limiter value, such as a value between 0.0 and 1.0 representing the percentage of the load demand to be met by the given DC power source 205, 206, 208, or 210, as a power sharing command to for the UPM 228, 230, 232, or 234 of the given DC power source 205, 206, 208, or 210 via the communication bus 203. The intended UPM 228, 230, 232, or 234 of the given DC power source 205, 206, 208, or 210 may receive its power sharing command and based on the received power sharing command via the communication bus 203 control its respective inverters to output its assigned share of the power needed to meet the load demand to the AC bus 116.

Figure 4:
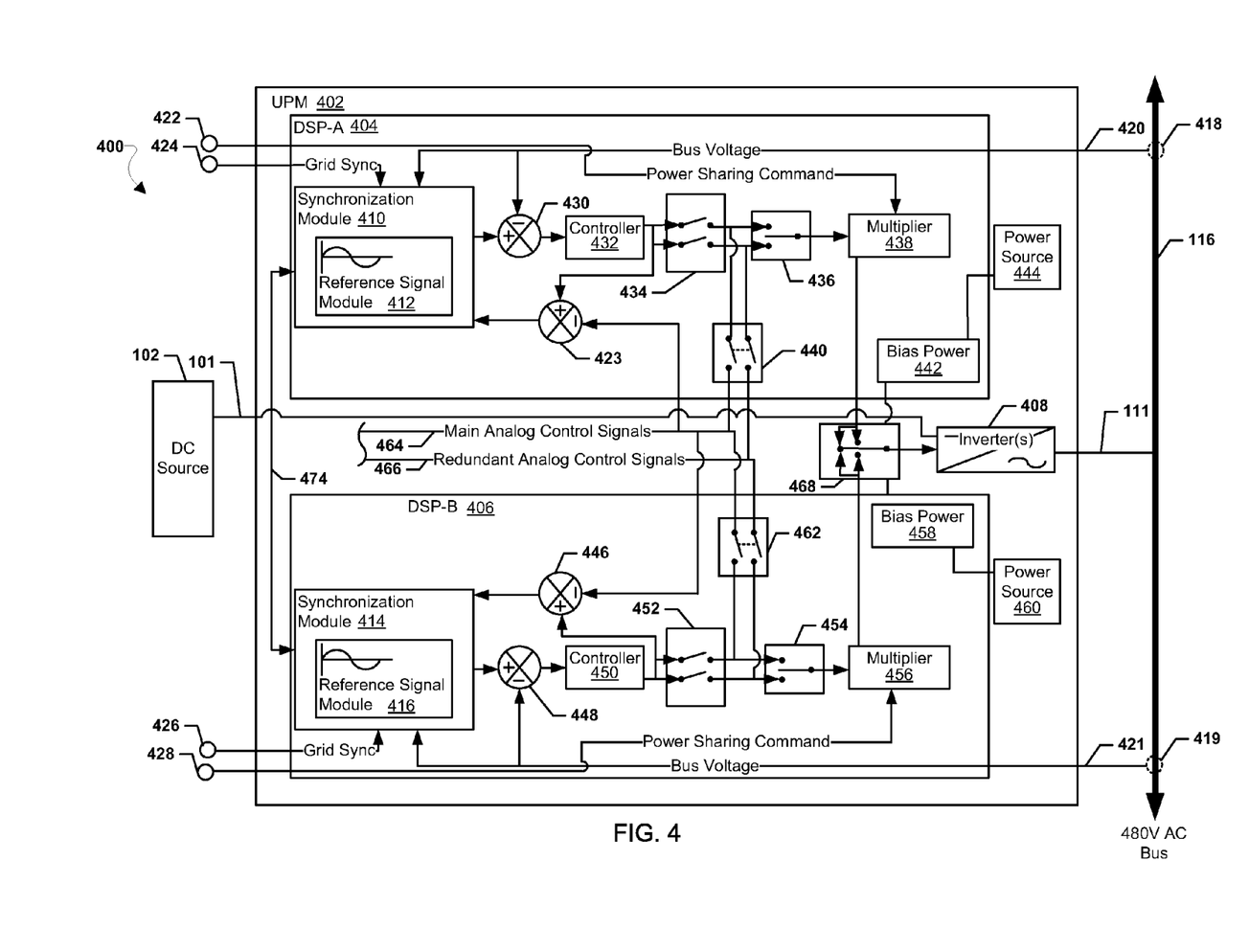
FIG. 4 is a block diagram illustrating a portion of another parallel UPM system according to an embodiment.

FIG. 4 is a block diagram illustrating a portion of another parallel UPM system 400 according to an embodiment. One difference between UPM system 400 and UPM system 100 described above with reference to FIG. 1 is that compared to a UPM 104 with a single DSP 106, the UPM system 400 may include a UPM 402 with more than one DSP, such as dual DSPs, DSP-A 404 and DSP-B 406. In an embodiment, each DSP-A 404 and DSP-B 406 may be identical redundant controllers to each other, and each DSP-A 404 and DSP-B 406 may be configured to control the series of one or more inverters 408 of the UPM 402 to convert the DC output of the DC source 102 received via the DC input line 101 to an AC output provided to the AC bus 116 via the AC output line 111. While illustrated as having dual DSPs, DSP-A 404 and DSP-B 406, UPM 402 may include more than two DSPs, such as three DSPs, four DSPs, or more DSPs, all configured to control the inventers 408 in a manner similar to DSP-A 404 and DSP-B 406.

DSP-A 404 may receive voltage measurements of the AC bus 116 from a voltage sensor 418 via a voltage sensor connection 420, and in this manner may monitor the voltage of the AC bus 116. DSP-B 406 may also receive voltage measurements of the AC bus 116 from a voltage sensor 419 via a voltage sensor connection 421, and in this manner may monitor the voltage of the AC bus 116. Via the two independent voltage sensor connections 420 and 421 with the two independent voltage sensors 418 and 419, the two DSPs, DSP-A 404 and DSP-B 406 may independently monitor the voltage of the AC bus 116. Alternatively, DSP-A 404 and DSP-B 406 may share a single sensor 418 and single connection 420.

DSP-A 404 may receive a grid synchronization signal via a synchronization connection 424. The grid synchronization signal may be reference sine wave received from another source, such as the grid, a generator, etc. DSP-B 406 may receive the same grid synchronization signal via another synchronization connection 426 to the same source. In this manner, because both DSP-A 404 and DSP-B 406 receive the same synchronization signal, DSP-A 404 and DSP-B 406 may be synchronized in both frequency and phase.

DSP-A 404 may include a connection 424, such as a wired or wireless connection, to an input controller, such as input controller 201 described above. DSP-B 406 may also include a connection 426, such as a wired or wireless connection, to the same input controller or a different input controller. Via the connections 424 and 426 DSP-A 404 and DSP-B 406 may receive power sharing commands from the input controller. In an embodiment, the power sharing command may be command received from the input controller that indicates an allocation of the load demand for the AC bus 116 that the UPM 402 may be required to meet based on the capacity of the DC source 102 connected to the UPM 402. In an embodiment, the power sharing command may be the same single power sharing command received by both DSP-A 404 and DSP-B 406 from the same input. In another embodiment, the power sharing commands may be two separate power sharing commands received from two different input controllers, where one input controller may be the primary input controller and the other input controller may be the redundant input controller. In such an embodiment, the power sharing commands may be separate commands, but the power sharing indication in the two separate power sharing commands may be the same (i.e., indicating the UPM 402 is assigned the same share of the power needed to meet the load demand to the AC bus 116).

The DSP-A 404 and DSP-B 406 may be connected to each other by one or more communication connection 474, such as a CAN connection. Via the communication connection 474 the DSP-A 404 and DSP-B 406 may share information, such as synchronization signals indicating which of the DSP-A 404 and DSP-B 406 should act as a master controller and/or which of the DSP-A 404 and DSP-B 406 should act as a slave controller.

DSP-A 404 and DSP-B 406 may be connected to the series of one or more inverters 408 of the UPM 402 by a switch 468. The switch 468 may be controlled by either or both of DSP-A 404 and DSP-B 406, for example by control connections (not shown for clarity in FIG. 4) to the DSP-A 404 and DSP-B 406. The switch 468 may be a three position selector switch configured such that in a first position a current command output from DSP-A 404 may be selected, in a second position a current command output from DSP-B 406 may be selected, or in a third position current commands output from DSP-A 404 and DSP-B 406 may be mixed together. The output of the switch 468 (i.e., the current command output from DSP-A 404, the current command output from DSP-B 406, or the mixed current command output from both DSP-A 404 and DSP-B 406) may be sent from the switch to the series of one or more inverters 408. In operation, the output of the switch 468 (i.e., the current command output from DSP-A 404, the current command output from DSP-B 406, or the mixed current command output from both DSP-A 404 and DSP-B 406) may control the series of one or more inverters 408 to draw a selected current, voltage, and/or power from the DC source 102 and/or output a selected current, voltage, and/or power to the AC bus 116. In an embodiment, each of DSP-A 404 and DSP-B 406 may be connected with a respective power source 444 and 460, which may provide power, such as a 24V DC power to a respective bias power module 442 or 458 of each of DSP-A 404 and DSP-B 406. The bias power modules 442 and 458 may be controlled by DSP-A 404 and DSP-B 406, respectively, to provide power to the switch 468 to control the operation of the switch 468.

In an embodiment, DSP-A 404 and DSP-B 406 may be operated in different modes: master-master mode and master-slave mode. In master-master mode, the switch 468 may be controlled by DSP-A 404 and DSP-B 406 to mix the inputs from DSP-A 404 and DSP-B 406 such that the current command output from DSP-A 404 and the current command output from DSP-B 406 may both be used to control the series of one or more inverters 408. The gain of DSP-A 404 and DSP-B 406 may be selected such that, should one of DSP-A 404 or DSP-B 406 malfunction or saturate, the non-malfunctioning or saturated DSP-A 404 or DSP-B 406 may offset the error. In master-slave mode, one of DSP-A 404 or DSP-B 406 may be addressed as the master controller while the other one of DSP-A 404 or DSP-B 406 may be the slave controller. The switch 468 may be controlled by the DSP-A 404 or DSP-B 406 addressed as the master controller to select only the input from the master controller in master-slave mode. When a fault occurs, the DSP-A 404 and DSP-B 406 may switch assigned roles and the switch 468 may be controlled by the new master controller to select only the input from the new master controller. When operating in master-slave mode, the quarter cycle output RMS/average voltage may be compared with a reference voltage and the DSP-A 404 and DSP-B 406 may switch assigned roles when the output voltage falls below the reference. Since the slave controller may already be in sync through the communication connection 474 or a grid synchronization, the slave controller may take control and become the master controller with a line cycle of the output voltage. In an embodiment, the data and time between two packets may be captured by the DSP-A 404 and DSP-B 406 and the DSP-A 404 and DSP-406 may be synchronized to each other. This synchronization may help ride through a fault of one of DSP-A 404 or DSP-B 406 in master-master mode and may help the slave controller to take control rapidly in master-slave mode. In an embodiment, the slave controller DSP-A 404 or DSP-B 406 may also synchronize with respect to the inverters 408 output voltage to synchronize with the designated master controller DSP-A 404 or DSP-B 406. In an embodiment, there may be two digital synchronization signals shared between the DSP-A 404 and DSP-B 406, with the status of the two signals indicating which of the DSP-A 404 and DSP-B 406 is the master and which is the slave. The synchronization status may be read back by the DSP-A 404 and/or DSP-B 406 to ensure in case of a single fault, the respective DSP-A 404 or DSP-B 406 gives control to the other DSP-A 404 or DSP-B 406.

In an embodiment, the DSP-A 404 of the UPM 402 may include a connection 422, such as a wired or wireless connection, to an input controller. The input controller may send power sharing commands to DSP-A 404 via the connection 422. DSP-B 406 may include a connection 428, such as a wired or wireless connection, to the input controller, and the input controller may send power sharing commands to DSP-B 406 via the connection 428. DSP-A 404 and DSP-B 406 may receive the power sharing commands and control the operation of the UPM 402 based at least in part on the received power sharing commands. In an embodiment, the power sharing commands received via connections 422 and 428 may be identical power sharing commands. In an embodiment, the power sharing commands received via connections 422 and 428 may each be unique power sharing commands intended separately for DSP-A 404 and DSP-B 406, respectively. The power sharing commands received via connections 422 and/or 428 may be commands received from an input controller that indicates an allocation of the load demand for the AC bus 116 that the UPM 402 may be required to meet based on the capacity of the DC source 102 connected to the UPM 402. In response to the power sharing commands received via connections 422 and/or 428, the DSP-A 404 and/or DSP-B 406 (depending on the operating mode, e.g., master-master or master-slave) may control the operations of the inverters 408 via one or more current commands sent via the switch 468 to the inverter(s) 408 to control the inverter(s) 408 to output a selected AC current, voltage, and/or power to the AC bus 116.

In an embodiment, DSP-A 404 and DSP-B 406 may be similar (or mirror image) processors including the same modules and may be configured to perform the same operations. DSP-A 404 and/or DSP-B 406 may generate a required current command based on the voltage of the AC bus 116 as measured by their respective voltage sensors 418 or 419. Based on analysis of modules of voltage loops running on DSP-A 404 and DSP-B 406, respectively, that may compare the voltage of the AC bus 116 with a selected reference voltage, such as 480 volts RMS, DSP-A 404 and/or DSP-B 406 may determine a power draw from the DC source 102 needed to meet a load demand of the AC bus 116. DSP-A 404 and/or DSP-B 406 may generate the required current command to control the inverters 408 to meet the load demand of the AC bus 116.

The respective voltage loops running on DSP-A 404 and/or DSP-B 406 may include various modules, such as a synchronization modules 410 and 414, comparator modules 430, 423, 448, and 446, controllers 432 and 450, and switching modules 434, 436, 440, 452, 454, and 462. In operation, the synchronization modules 410 and 414 of each DSP-A 404 and DSP-B 406 may receive the measured bus voltage of the AC bus 116, may determine the RMS value of the bus voltage, and may compare the bus voltage to reference signal generated by a respective reference signal module 412 or 416 or a grid synchronization signal received via synchronization connection 424 or 426. The output of the synchronization modules 410 and 414 may be sent to the respective comparator modules 430 or 448. The comparator modules 430 or 448 may compare the bus voltage of the AC bus 116 to the output of the synchronization modules 410 and 414 and output the result of the comparison to controllers 432 or 450, respectively, which may determine a power draw from the DC source 102 needed to meet a load demand based on the difference between the output of the synchronization modules 410 and 414 and the voltage of the AC bus 116. The controllers 432 or 450, such as d-q controllers, may generate a required current command corresponding to the determined power draw from the DC source 102 need to meet the load demand. The controllers 432 or 450 may output the required current command to their respective switching modules 434 or 452 and respective comparator modules 423 and 446. The controllers 432 or 450 may output the required current command to two different inputs to their respective switching modules 434 or 452. In this manner, one input may act as the main required current command and the other input may act as the redundant required current command.

In an embodiment, switching modules 434 and 452 may be opened or closed depending on the status of each respective DSP-A 404 and DSP-B 406 as operating in master or slave mode. When DSP-A 404 and/or DSP-B 406 are in master mode, switching module 434 and/or 452, respectively, may be closed. When DSP-A 404 and DSP-B 406 are in slave mode, switching module 434 and/or 452, respectively, may be open. When switching module 434 and/or 452 is closed the main and redundant required current commands may be output to switching modules 436, 440, 454, and 462, respectively. Switching modules 440 and 462 may be controlled by a module of their respective DSP-A 404 or DSP-B 406, such as the synchronization module 410 to open or close to couple or decouple the DSP-A 404 or DSP-B 406 from the main analog control signal line 464 and redundant analog control signal line 466. The main required current command may be sent from switching modules 434 and 440 or switching modules 452 and 462 to the main analog control signal line 464. The redundant required current command may be sent from switching modules 434 and 440 or switching modules 452 and 462 to the redundant analog control signal line 466. In an embodiment in which there are additional DSPs in addition to DSP-A 404 and DSP-B 406, the additional DSPs may each be connected to the main analog control signal line 464 and the redundant analog control signal line 466 and the main analog control signal line 464 and/or redundant analog control signal line 466 may enable the main required current command and/or the redundant required current command to be shared among the multiple DSPs.

In an embodiment, comparator modules 423 and 446 may be connected to the main analog control signal line 464 and may receive the main required current command and compare it to the current command output from controller 432 or 450, respectively. Comparator modules 423 and 446 may also be connected to the redundant analog control signal line 466. The result of the comparison of the current command output from controller 432 or 450, respectively, and the main or redundant current command on the main analog control signal line 464 or the redundant analog control signal line 466 may be output to the synchronization modules 410 and 414, respectively. Each synchronization module 410 and 414 may monitor the output of its respective comparator module 423 and 446 to determine whether the controller output (e.g., the current command) is within an output range for amplitude and/or frequency. When the controller output is outside the output range for amplitude and/or frequency, the controlling DSP-A 404 or DSP-B 406 (i.e., the master) may not be able to control the output of the UPM 402, and may indicate as much to the other DSP-A 404 or DSP-B 406, for example via the communication connection 474, enabling the other DSP-A 404 or DSP-B 406 to take control. If the other DSP-A 404 or DSP-B 406 is unable to stabilize the output in a few cycles, it may give up control indicating an external event has occurred, such as a load short, open fuse, etc.).

In an embodiment, switching modules 436 and 454 may be configured to select between the main and redundant required current command output by the switching modules 434 and 452, respectively, and may output the selected main or redundant required current command to their respective multiplier module 438 or 456. The multiplier modules 438 and 456, respectively, may multiply any received power sharing command received on connections 422 or 428 with the required current command generated by the voltage loop of DSP-A 404 or DSP-B 406 (i.e., the required current command received from the switching module 436 or 454, respectively) to generate the output current command output to the switch 468 and thereby inverters 408. For example, the power sharing command may be a value from 0.00 to 1.00 indicating the percentage of the load demand the DC source 102 should support. The output current command via the switch 468 may control the inverters 408 to convert the DC output of the DC power source 102 to an AC output provided to the AC bus 116 to meet the share of the load demand assigned to the UPM 402 as indicated by the power sharing command received via connection 422 and/or 428.

Figure 5:
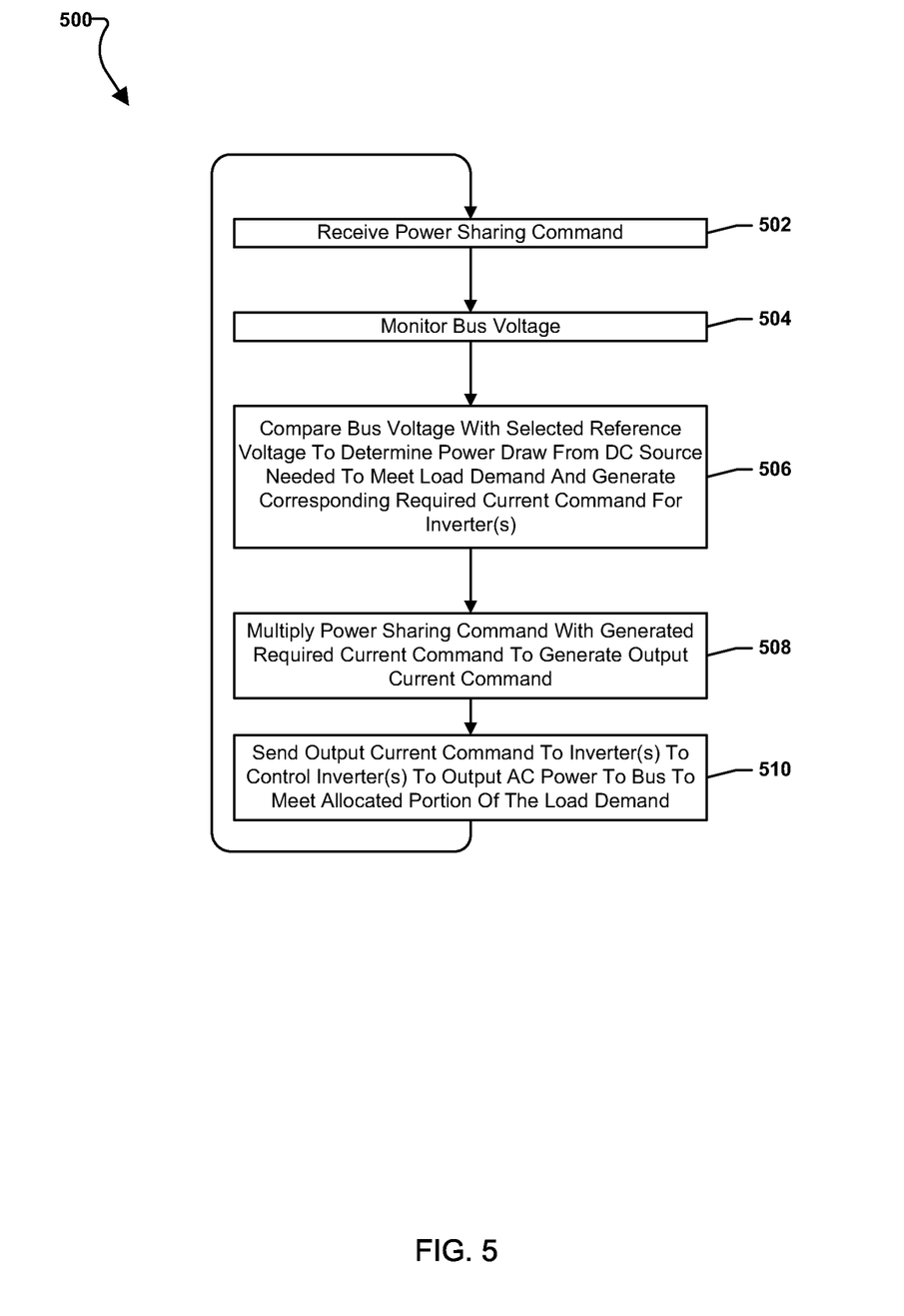
FIG. 5 is a process flow diagram illustrating an embodiment method for controlling inverter(s) in response to a power sharing command.

FIG. 5 illustrates an embodiment method 500 for controlling one or more inverters in response to a power sharing command. In an embodiment, the operations of method 500 may be performed by a processor of a UPM, such as DSPs 106, 404, or 406 described above. In block 502, the processor may receive a power sharing command, such as a power sharing command generated by an input controller. In an embodiment, the power sharing command may indicate an allocated portion of a load demand to be met by a UPM. For example, the power sharing command may be a value from 0.00 to 1.00. In block 504, the processor may monitor the bus voltage. For example, the processor may monitor the bus voltage via a voltage sensor connected to the bus.

In block 506 the processor may compare the bus voltage with a selected reference voltage to determine a power draw from a DC source needed to meet a load demand and generate a corresponding required current command for the one or more inverters. In block 508 the processor may multiple the power sharing command with the generated required current command to generate an output current command. In this manner, by multiplying the power sharing command by the required current command the processor may generate an output current command configured to control the inverters to meet the portion of the load demand allocated to the UPM by the input controller. In block 510 the processor may send the output current command to the one or more inverters to control the one or more inverters to output AC power to the bus to meet the allocated portion of the load demand for the UPM.

Figure 6:
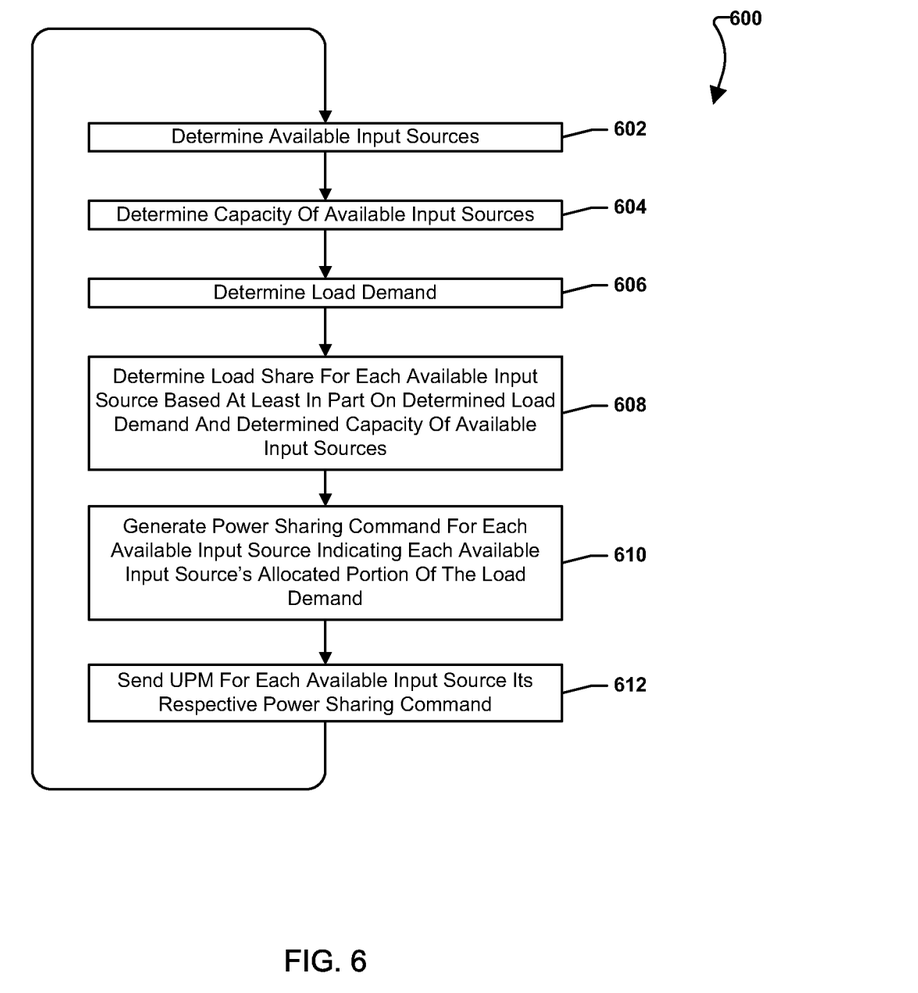
FIG. 6 is a process flow diagram illustrating an embodiment method for generating power sharing commands.

FIG. 6 illustrates an embodiment method 600 for generating power sharing commands. In an embodiment, the operations of method 600 may be performed by an input controller, such as input controller 201 described above. In block 602 the input controller may determine the available input sources. In an embodiment, the available input sources may be one or more DC power source, such as DC power sources 205, 206, 208, and/or 210 described above, available to provide power to a series of UPMs for conversion and output to an AC bus. In block 604 the input controller may determine the capacity of the available input sources. In an embodiment, the input controller may determine the capacity of the available input sources by measuring their DC voltage outputs. In block 606 the input controller may determine the load demand. In an embodiment, the input controller may determine the load demand based on information indicating the devices connected to the AC bus and the power requirements of those devices.

In block 608 the input controller may determine a load share for each available input source based at least in part on the determined load demand and determined capacity of the available input sources. In an embodiment, the input controller may be configured to share the load equally among all available input sources. In another embodiment, the input controller may assign different shares of the load to different available input sources, for example giving newly started available input sources less load share than already operating available input sources. In block 610 the input controller may generate a power sharing command for each available input source indicating each available input source's allocated portion of the load demand. For example, the input controller may indicate each available input sources' percentage share of the load demand as a decimal value from 0.00 to 1.00. In block 612 the input controller may send each UPM for each available input source its respective power sharing command. For example, the input controller may send the power sharing commands via a CAN bus connection to each UPM.

Figure 7:
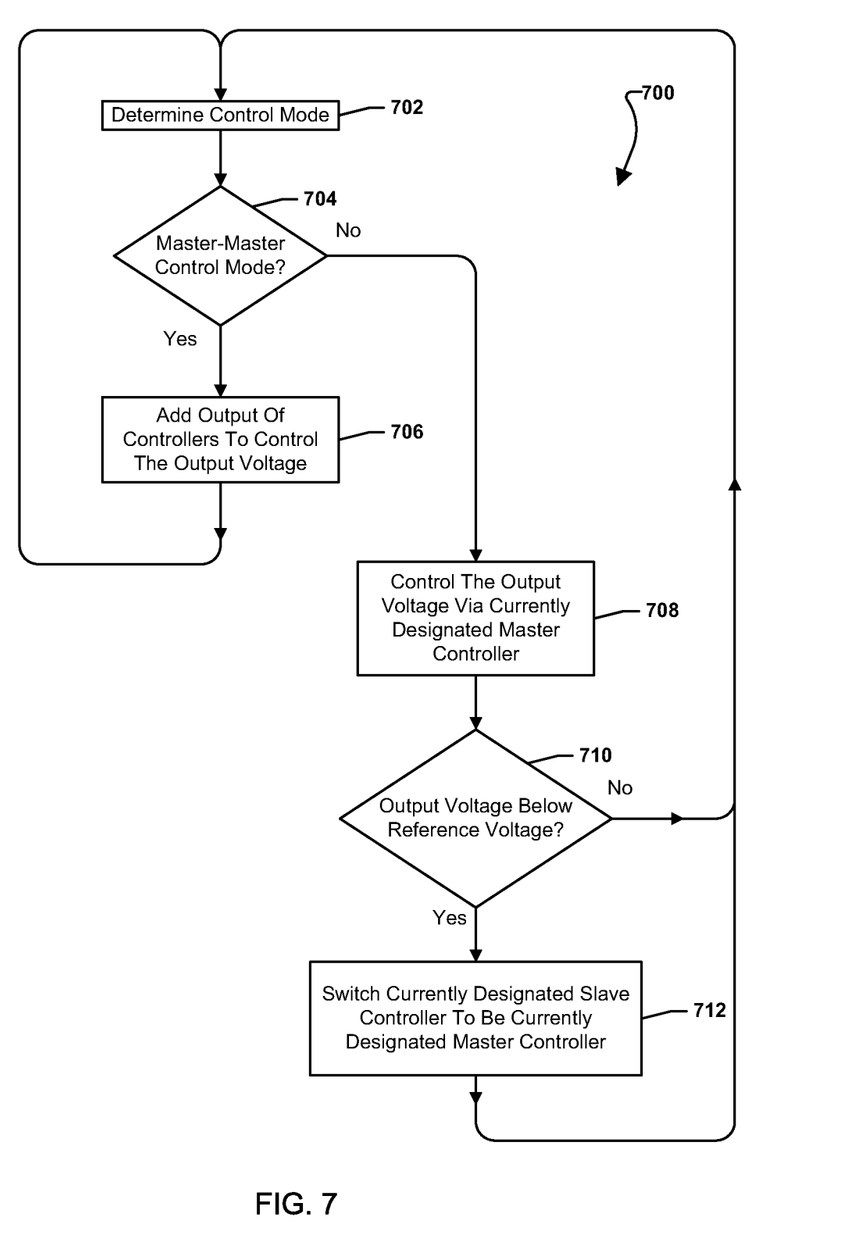
FIG. 7 is a process flow diagram illustrating an embodiment method for controlling the output voltage of a dual controller UPM.

FIG. 7 illustrates an embodiment method 700 for controlling the output voltage of a dual controller UPM. In an embodiment, the operations of method 700 may be performed by one or more processors of a dual controller UPM, such as synchronization modules 410 and/or 414 of DSP-A 404 and DSP-B 406 of UPM 402 described above.

In block 702 the processor may determine the control mode of the UPM. In an embodiment, the control mode may be "master-master" or "master-slave." In master-master control mode the two processors of the UPM may both control the one or more inverters or the UPM. In master-slave mode one processor of the UPM may control the inverters of the UPM while the other waits to act as a back up in the even the current master processor cannot maintain control. In an embodiment, the processor may determine the control mode based on one or more synchronization signal. In determination block 704 the processor may determine whether the control mode is master-master. In response to determining the control mode is master-master (i.e., determination block 704="Yes"), in block 706 the processor may add the output of the two controllers or processors to control the output voltage. For example, the processor may control a switch (e.g., 468) to combine current commands from both processors and send the combined current commands to the inverters of the UPM. The processor may return to block 702 and continue to determine the control mode of the UPM.

In response to determining the control mode is master-slave (i.e., determination block 704="No"), in block 708 the processor may control the output voltage via the currently designated master controller or processor. In determination block 710 the processor may determine whether the output voltage has fallen below the reference voltage. In response to determining the output voltage has not fallen below the reference voltage (i.e., determination block 710="No"), the processor may return to block 702 and continue to determine the control mode of the UPM. In response to determining the output voltage is below the reference voltage (i.e., determination block 710="Yes"), in block 712 the processor may switch the currently designated slave controller or processor to be the currently designated master controller or processor, thereby reversing the master and slave designations of the controller or processors of the UPM. The processor may return to block 702 and continue to determine the control mode of the UPM.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A system, comprising:
   an alternating current (AC) bus;
   a first direct current (DC) power source; and
   a first uninterruptable power module (UPM) connecting the first DC power source to the AC bus, the first UPM comprising:
   a first plurality of inverters; and
   a first processor connected to the first plurality of inverters,
   wherein the first processor is configured with processor-executable instructions to perform operations comprising:
   receiving a power sharing command from an input controller; and
   controlling the first plurality of inverters to convert a DC output of the first DC power source to an AC output provided to the AC bus based at least in part on the received power sharing command;
   wherein:
   the received power sharing command indicates an allocated portion of a load demand to be met by the first UPM; and
   the first processor is configured with processor-executable instructions to perform operations such that controlling the first plurality of inverters to convert the DC output of the first DC power source to the AC output provided to the AC bus based at least in part on the received power sharing command comprises:
   generating a required current command based at least in part on a voltage of the AC bus;
   multiplying the received power sharing command with the generated required current command to generate an output current command; and
   sending the output current command to the first plurality of inverters to control the first plurality of inverters to convert the DC output of the first DC power source to the AC output provided to the AC bus to meet the allocated portion of the load demand.

2. The system of claim 1, wherein the first processor is configured with processor-executable instructions to perform operations such that generating a required current command based at least in part on a voltage of the AC bus comprises:

comparing a voltage of the AC bus with a selected reference voltage to determine a power draw from the first DC source needed to meet the load demand; and generating a required current command corresponding to the determined power draw from the first DC source needed to meet the load demand.

3. The system of claim 2, wherein the selected reference voltage is 480 volts.

4. The system of claim 1, further comprising:
an input controller connected to the first UPM;
a second DC power source; and
a second UPM connecting the second DC power source to the AC bus and connected to the input controller;
wherein the input controller is configured to perform operations comprising:
determining an allocated portion of a load demand to be met by each of the first UPM and the second UPM;
generating power sharing commands for each of the first UPM and the second UPM indicating the allocated portion of the load demand to be met by each respective UPM; and
sending the power sharing commands to the first UPM and the second UPM, respectively.

5. The system of claim 4, wherein the input controller is configured to perform operations such that determining an allocated portion of a load demand to be met by each of the first UPM and the second UPM comprises determining an allocated portion of a load demand to be met by each of the first UPM and the second UPM based on a determined capacity of each of the first DC power source and the second DC power source.

6. The system of claim 4, wherein the first DC power source and the second DC power source are separate fuel cell systems.

7. The system of claim 1, wherein:
the first UPM further comprises a second processor connected to the first processor and connected to the first plurality of inverters; and
the second processor is configured with processor-executable instructions to perform operations comprising:
receiving the power sharing command from the input controller; and
controlling the first plurality of inverters to convert the DC output of the first DC power source to the AC output provided to the AC bus based at least in part on the received power sharing command in response to a synchronization signal.

8. The system of claim 7, wherein the first processor is configured with processor-executable instructions to perform operations comprising:
determining whether an output voltage of the first UPM falls below a reference voltage; and
sending the synchronization signal to the second processor in response to determining the output voltage of the first UPM falls below a reference voltage.

9. The system of claim 1, wherein the first DC power source is selected from the group consisting of a solar array, fuel cell stack, wind turbine, thermo-electric device, and battery.

10. A method for operating an uninterruptable power module (UPM) connecting a direct current (DC) power source to an alternating current (AC) bus, comprising:
receiving a power sharing command at the UPM;
receiving a DC output from the DC power source at the UPM;

controlling a first plurality of inverters of the UPM to convert the DC output of the DC power source to an AC output based at least in part on the received power sharing command; and providing the AC output from the UPM to the AC bus;
wherein:
the power sharing command is received at the UPM from an input controller;
the received power sharing command indicates an allocated portion of a load demand to be met by the UPM; and
controlling the first plurality of inverters of the UPM to convert the DC output of the DC power source to an AC output provided to the AC bus based at least in part on the received power sharing command comprises:
generating, at the UPM, a required current command based at least in part on a voltage of the AC bus;
multiplying, at the UPM, the received power sharing command with the generated required current command to generate an output current command; and
sending the output current command to the first plurality of inverters of the UPM to control the first plurality of inverters to convert the DC output of the DC power source to the AC output to meet the allocated portion of the load demand.

11. The method of claim 10, wherein generating, at the UPM, a required current command based at least in part on a voltage of the AC bus comprises:
comparing, at the UPM, a voltage of the AC bus with a selected reference voltage to determine a power draw from the first DC source needed to meet the load demand; and
generating, at the UPM, a required current command corresponding to the determined power draw from the DC source needed to meet the load demand.

12. The method of claim 11, wherein the selected reference voltage is 480 volts.

13. The method of claim 10, wherein:
the UPM includes a first processor and a second processor; and
receiving a power sharing command at the UPM comprises receiving a power sharing command from an input controller at the first processor and the second processor,
the method further comprising controlling the first plurality of inverters by the second processor to convert the DC output of the DC power source to the AC output based at least in part on the received power sharing command in response to a synchronization signal.

14. The method of claim 13, further comprising:
determining, at the first processor, whether an output voltage of the UPM falls below a reference voltage; and
sending, from the first processor, the synchronization signal to the second processor in response to determining the output voltage of the first UPM falls below a reference voltage.

15. The method of claim 14, further comprising switching, at the first processor, a designation of the second processor from a slave controller to a master controller in response to determining the output voltage of the first UPM falls below the reference voltage.

16. The method of claim 13, further comprising:
determining whether a control mode is a master-master control mode; and
controlling the first plurality of inverters by adding outputs of the first processor and the second processor to convert the DC output of the DC power source to the AC output based at least in part on the received power sharing command in response to determining the control mode is the master-master control mode.

17. The method of claim 10, wherein the DC source is selected from the group consisting of a solar array, fuel cell stack, wind turbine, thermo-electric device, and battery.

18. The method of claim 10, further comprising:
determining, at an input controller, an allocated portion of a load demand to be met by each of the UPM and a second UPM connecting a second DC power source to the AC bus;
generating, at the input controller, power sharing commands for each of the UPM and the second UPM indicating the allocated portion of the load demand to be met by each respective UPM; and
sending, from the input controller, the power sharing commands to the UPM and the second UPM, respectively.

19. A method for operating an uninterruptable power module (UPM) connecting a direct current (DC) power source to an alternating current (AC) bus, comprising:
receiving a power sharing command at the UPM;
receiving a DC output from the DC power source at the UPM;
controlling a first plurality of inverters of the UPM to convert the DC output of the DC power source to an AC output based at least in part on the received power sharing command; and
providing the AC output from the UPM to the AC bus;
wherein:
the UPM includes a first processor and a second processor; and
receiving a power sharing command at the UPM comprises receiving a power sharing command from an input controller at the first processor and the second processor,
the method further comprising controlling the first plurality of inverters by the second processor to convert the DC output of the DC power source to the AC output based at least in part on the received power sharing command in response to a synchronization signal.

20. The method of claim 19, further comprising:
determining, at the first processor, whether an output voltage of the UPM falls below a reference voltage; and
sending, from the first processor, the synchronization signal to the second processor in response to determining the output voltage of the first UPM falls below a reference voltage.

21. The method of claim 20, further comprising switching, at the first processor, a designation of the second processor from a slave controller to a master controller in response to determining the output voltage of the first UPM falls below the reference voltage.

22. The method of claim 19, further comprising:
determining whether a control mode is a master-master control mode; and
controlling the first plurality of inverters by adding outputs of the first processor and the second processor to convert the DC output of the DC power source to the AC output based at least in part on the received power sharing command in response to determining the control mode is the master-master control mode.

23. A system, comprising:
an alternating current (AC) bus;
a first direct current (DC) power source; and
a first uninterruptable power module (UPM) connecting the first DC power source to the AC bus, the first UPM comprising:
a first plurality of inverters; and
a first processor connected to the first plurality of inverters,
wherein the first processor is configured with processor-executable instructions to perform operations comprising:
receiving a power sharing command from an input controller; and
controlling the first plurality of inverters to convert a DC output of the first DC power source to an AC output provided to the AC bus based at least in part on the received power sharing command;
wherein:
the first UPM further comprises a second processor connected to the first processor and connected to the first plurality of inverters; and
the second processor is configured with processor-executable instructions to perform operations comprising:
receiving the power sharing command from the input controller; and
controlling the first plurality of inverters to convert the DC output of the first DC power source to the AC output provided to the AC bus based at least in part on the received power sharing command in response to a synchronization signal.

24. The system of claim 23, wherein the first processor is configured with processor-executable instructions to perform operations comprising:
determining whether an output voltage of the first UPM falls below a reference voltage; and
sending the synchronization signal to the second processor in response to determining the output voltage of the first UPM falls below a reference voltage.

* * * * *